Patented Mar. 7, 1939

2,150,120

UNITED STATES PATENT OFFICE 2,150,120

CYCLIC PROCESS FOR THE PRODUCTION OF NITROPARAFFINS

Edward B. Hodge, Terre Haute, Ind., assignor to Commercial Solvents Corporation, Terre Haute, Ind., a corporation of Maryland No Drawing. Application January 31, 1938, Serial No. 187,901

10 Claims. (Cl. 260—644)

My invention relates to a process for the production of nitroparaffins by the vapor phase nitration of paraffin hydrocarbons, and more particularly, to an improved process of this nature in which unreacted materials are recycled.

The nitration of paraffin hydrocarbons such as ethane, propane, butane and the like, is most advantageously carried out in a continuous vapor phase process as described in U. S. Patents 1,967,667 and 2,071,122 of H. B. Hass et al. In accordance with this process gaseous hydrocarbons and nitric acid vapors or nitrogen dioxide are reacted in a heated reaction chamber to produce nitroparaffins. The gaseous reaction products contain, in addition to the nitroparaffins produced, water vapor, unreacted nitric acid or nitrogen dioxide, unreacted paraffin hydrocarbons and small amounts of certain other compounds. In the patents referred to above it was recommended that for cyclic operation the unreacted nitric acid and oxides of nitrogen could be removed and the remaining gases could then be recycled after purging the uncondensable gases from the system. It was found that relatively low yields and conversions were obtained in recycling hydrocarbons in this manner and an improved procedure is described in copending application, Ser. No. 187,407 of Jerome Martin and Edward B. Hodge, filed January 28, 1938. According to this procedure the exit gases from the process, after separation of the nitroparaffins, are subjected to water scrubbing, preferably followed by sulfuric acid scrubbing, to remove aldehydes and ketones. By employing this step in the recycling process, a considerable improvement in yields and conversions is obtained, but these values are still below the yields and conversions obtainable with fresh hydrocarbons.

I have now found that a still further improvement in the cyclic process can be secured by subjecting the gases to catalytic hydrogenation, after removal of the nitroparaffins and separation of the oxides of nitrogen. In the preferred application of my process the gases are also previously treated to remove aldehydes, ketones and other water soluble materials, in accordance with the process of U. S. Serial No. 187,407, referred to above, prior to the hydrogenation treatment. In accordance with the present process, I have found that the gases may be recycled with resulting yields and conversions substantially equal to those obtained with fresh hydrocarbons. Although greatly improved results are thus obtainable, I have not proved the theory underlying this improvement. It is probable that certain unsaturated materials are present in the exit gases, but these materials are of such nature that they are not removed by previous scrubbing with sulfuric acid, the latter step being preferably included in the recycling operation, together with my hydrogenation step.

In carrying out my process the nitration reaction may be effected in the known manner, as for example in accordance with the procedure described in the patents of Hass et al., referred to above. The reaction may be effected at atmospheric pressure or at increased pressures, and the entire system for the recycling of the gases may suitably be maintained at the nitration reaction pressure. The products leaving the reaction vessel may be cooled in the usual manner to remove the bulk of the nitroparaffins and water vapor. The gases may then be further cooled by refrigeration, or otherwise suitably treated to remove substantially all of the remaining nitroparaffins and a portion of the other compounds which are normally liquid in nature. The oxides of nitrogen may then be separated from the gases for regeneration of nitrogen dioxide or nitric acid for the reaction, and the remaining gases may then be subjected to hydrogenation prior to recycling. In such a process the aldehydes, ketones and small amounts of other water soluble products in the gases will be subjected to hydrogenation with formation of aliphatic alcohols and other normally liquid products, which should be separated from the gases by condensation, water scrubbing or other suitable means, prior to the recycling. I prefer, therefore, to remove such compounds prior to the hydrogenation step, by scrubbing with water, followed by sulfuric acid scrubbing, in accordance with the process of U. S. Ser. No. 187,407 referred to above. Small quantities of non-condensable gases, such as nitrogen or oxides of carbon, may be purged from the system by compressing and liquefying the hydrocarbons and separating the gases from the resulting liquid hydrocarbons. This step may follow the hydrogenation or may precede it, in which latter case the gases, following hydrogenation, may be directly recycled to the reaction chamber.

The hydrogenation reaction may be carried out in accordance with known methods for hydrogenation in the gaseous phase. The usual catalysts such as nickel, nickel activated with small amounts of other materials, cobalt, platinum black, sponge platinum, palladium and the like, may suitably be employed. The usual catalysts supports, such as asbestos, pumice, silica gel, vitrified alumina, and the like, may be utilized in conjunction with the metal catalysts, if desired. I prefer to employ a crushed material such as vitrified alumina impregnated with metallic salts, which are then reduced in situ to the metallic form. The reaction temperature and space velocity will depend upon the particular catalyst employed and can readily be determined from preliminary experiments. In general, temperatures of 150° C. to 400° C. may be employed. In the case of active nickel catalysts, I have found that temperatures of 175–275° C. and space velocities of 800–1600 (cu. ft. of gas at 0° C. and 760 mm. per cu. ft. of a catalyst per hour) are satisfactory.

The amount of hydrogen necessary to effect the hydrogenation action will of course depend upon the concentration of reducible compounds in the gases. In a procedure in which all of the nitroparaffins, aldehydes, ketones and other water soluble compounds are completely removed prior to hydrogenation, I have found that approximately 25% of hydrogen, by volume, is ample for satisfactory operation and that considerably less may be used in most cases. If small amounts of nitroparaffins, together with aldehydes and ketones, are present during the hydrogenation, increased amounts of hydrogen will be required, and in any event a substantial excess may be employed without undesirable effects. For most economical operation, the minimum amount of hydrogen for complete reaction should of course be utilized, and this may be determined in any given case noting the amount of hydrogen in the purged non-condensable gases, or by following the yield and conversion obtained with the recycled hydrocarbons.

My invention will now be illustrated by the following specific examples:

Example I

The reaction products from the nitration of propane with nitric acid were passed through a condenser maintained at approximately 15° C. to remove nitroparaffins and water vapor and then through a water scrubber and a scrubber containing 70% sulfuric acid to remove aldehydes, ketones and other soluble materials. The resulting gases were then passed through a scrubber containing 15% ferrous sulfate solution to remove nitric oxide. Approximately 8%, by volume, of hydrogen was then mixed with the gases, which were passed over an active nickel catalyst supported on crushed vitrified alumina at atmospheric pressure, a temperature of 190° C., and a space velocity of 800. The resulting gases, after purging non-condensable gases, were found to be suitable for recycling in the process, with substantially no reduction in yield or conversion as compared with fresh hydrocarbons.

Example II

The reaction products from the nitration of propane with nitric acid were passed through a condenser to remove nitroparaffins and water vapor; then through a water scrubber and a scrubber containing 70% sulfuric acid to remove aldehydes, ketones and other soluble materials, and then through a scrubber containing ferrous sulfate solution to remove nitric oxide as in Example I. Approximately 5%, by volume, of hydrogen was then mixed with the gases, which were passed over an active nickel catalyst supported on crushed vitrified alumina at atmospheric pressure, a temperature of 240° C. and a space velocity of 1500. The resulting gases, after purging non-condensable gases, were found to be suitable for recycling in the process with substantially no reduction in yield or conversion, as compared with fresh hydrocarbons.

Example III

The reaction products from the nitration of propane with nitric acid, were passed through a condenser to remove nitroparaffins and water vapor, then through a water scrubber and a scrubber containing sulfuric acid to remove aldehydes, ketones and other water soluble materials, and then through a scrubber containing ferrous sulfate solution to remove nitric oxide as in Example I. Approximately 7% by volume of hydrogen was then mixed with the gases, which were passed over an active nickel catalyst supported on crushed alumina at a pressure of 75 lbs. per sq. in., a temperature of 225° C. and a space velocity of 1500. The resulting gases, after purging non-condensable gases, were found to be suitable for recycling in the process, with substantially no reduction in yield or conversion, as compared with fresh hydrocarbons.

It is to be understood, of course, that the above examples are illustrative only and are not to be construed as limiting the scope of my invention. My process is particularly adapted to the treatment of reaction products of the nitration of the lower paraffin hydrocarbons, such as ethane, propane, and butane, but it is also applicable in vapor phase cyclic processes for the nitration of any of the other paraffin hydrocarbons. As has been previously pointed out, my hydrogenation process may be employed irrespective of the application of other steps such as water scrubbing or sulfuric acid scrubbing. The gases to be recycled may be subjected to hydrogenation following removal of oxides of nitrogen, without the use of any other purification steps; but the hydrogenation may also be utilized in conjunction with any number of other desired purification procedures. It will be apparent, to those skilled in the art, that the order of steps in such combination processes may be varied, and that numerous other modifications of procedure may be employed without departing from the scope of my invention. It is to be understood, therefore, that my invention includes all such modifications and the use of any equivalents which would normally occur to those skilled in the art.

My invention now having been described, what I claim is:

1. In a cyclic process for the nitration of lower alkanes, the steps which comprise removing lower nitroalkanes and oxides of nitrogen from the gaseous mixture resulting from the nitration of said lower alkanes and subjecting the remaining constituents of said gaseous mixture to catalytic hydrogenation, and introducing the resulting gases into the reaction mixture for the succeeding cycle.

2. In a cyclic process for the nitration of lower alkanes, the steps which comprise removing lower nitroalkanes and oxides of nitrogen from the gaseous mixture resulting from the nitration of said lower alkanes, mixing the resulting gases with from 5 to 25% by volume of hydrogen, and passing the resulting mixture over a hydrogenation catalyst at temperatures of 175–400° C., and introducing the resulting gases into the reaction mixture for the succeeding cycle.

3. In a cyclic process for the nitration of lower alkanes, the steps which comprise removing lower nitroalkanes and oxides of nitrogen from the gaseous mixture resulting from the nitration of said lower alkanes, mixing the resulting gases with from 5 to 25% by volume of hydrogen, passing the resulting mixture over a nickel hydrogenation catalyst at temperatures of 175–400° C., at space velocities of 800–1600, and introducing the resulting gases into the reaction mixture for the succeeding cycle.

4. In a cyclic process for the nitration of lower alkanes, the steps which comprise removing lower nitroalkanes, normally liquid, water-soluble compounds and oxides of nitrogen from the gaseous mixture resulting from the nitration of said lower alkanes, subjecting the remaining constituents of said gaseous mixture to catalytic hydrogenation, and introducing the resulting gases into the reaction mixture for the succeeding cycle.

5. In a cyclic process for the nitration of lower alkanes, the steps which comprise separating lower nitroalkanes from the gaseous mixture resulting from the nitration of said lower alkanes, subjecting the remaining constituents of said gaseous mixture to water scrubbing, separating oxides of nitrogen from the scrubbed gases, subjecting the remaining constituents of said gaseous mixture, which is free from oxides of nitrogen to catalytic hydrogenation, and introducing the resulting gases into the reaction mixture for the succeeding cycle.

6. In a cyclic process for the nitration of ethane, the steps which comprise removing lower nitroalkanes and oxides of nitrogen from the gaseous mixture resulting from the nitration of said lower alkane, subjecting the remaining constituents of said gaseous mixture to catalytic hydrogenation, and introducing the resulting gases into the reaction mixture for the succeeding cycle.

7. In a cyclic process for the nitration of propane, the steps which comprise removing lower nitroalkanes and oxides of nitrogen from the gaseous mixture resulting from the nitration of said lower alkane, subjecting the remaining constituents of said gaseous mixture to catalytic hydrogenation, and introducing the resulting gases into the reaction mixture for the succeeding cycle.

8. In a cyclic process for the nitration of butane, the steps which comprise removing lower nitroalkanes and oxides of nitrogen from the gaseous mixture resulting from the nitration of said lower alkane, subjecting the remaining constituents of said gaseous mixture to catalytic hydrogenation, and introducing the resulting gases into the reaction mixture for the succeeding cycle.

9. In a cyclic process for the nitration of propane, the steps which comprise separating lower nitroalkanes from the nitration mixture resulting from nitration of said lower alkane, subjecting the resulting gases which are free from lower nitroalkanes to water scrubbing, followed by scrubbing with approximately 70% sulfuric acid, separating oxides of nitrogen from the scrubbed gases, mixing the remaining constituents of said gaseous mixtures with approximately 5–25%, by volume, of hydrogen, passing the mixture over a hydrogenation catalyst at temperatures of 175–400° C., and introducing the resulting gases into the reaction mixture for the succeeding cycle.

10. In a cyclic process for the nitration of propane, the steps which comprise separating lower nitroalkanes from the nitration mixture resulting from nitration of said lower alkane, subjecting the resulting gases which are free from lower nitroalkanes to water scrubbing, followed by scrubbing with approximately 70% sulfuric acid, separating oxides of nitrogen from the scrubbed gases, mixing the remaining constituents of said gaseous mixtures with approximately 5–25%, by volume, of hydrogen, passing the mixture over a nickel hydrogenation catalyst at temperatures of 175–400° C., and at space velocities of 800–1600, and introducing the resulting gases into the reaction chamber for the succeeding cycle.

EDWARD B. HODGE.